United States Patent [19]

Müller et al.

[11] Patent Number: 5,424,711
[45] Date of Patent: Jun. 13, 1995

[54] ULTRASONIC MONITORING SYSTEM FOR THE INTERIOR OF A MOTOR VEHICLE

[75] Inventors: Norbert Müller; Berthold Wolfram, both of Regensburg, Germany

[73] Assignee: Siemens Aktiengesellschaft, Munich, Germany

[21] Appl. No.: 927,276
[22] PCT Filed: Jun. 13, 1991
[86] PCT No.: PCT/EP91/01105
  § 371 Date: Sep. 21, 1992
  § 102(e) Date: Sep. 21, 1992
[87] PCT Pub. No.: WO92/02831
  PCT Pub. Date: Feb. 20, 1992

[30] Foreign Application Priority Data

Jul. 27, 1990 [DE] Germany .............. 90114483.2

[51] Int. Cl.⁶ .............................................. B60R 25/10
[52] U.S. Cl. ............................. 340/426; 340/541; 367/93
[58] Field of Search ............. 340/425.5, 426, 552, 340/554, 541; 367/93, 94; 307/10.2

[56] References Cited

U.S. PATENT DOCUMENTS 3,805,223 4/1974 Nilsson et al. .................. 367/93
4,929,925 5/1990 Bodine et al. ................. 340/426

FOREIGN PATENT DOCUMENTS

2817492 10/1979 Germany .
2938969 4/1981 Germany .
3003887 8/1981 Germany .

Primary Examiner—Jeffery A. Hofsass
Attorney, Agent, or Firm—Hill, Steadman & Simpson

[57] ABSTRACT

An ultrasonic monitoring system for the interior of a motor vehicle having two mutually spatially separately secured emission elements (S1, S2), the main lobes of the directional characteristics of which are oriented in different directions, and having at least one reception element (E1, E2), but at as a rule having at least two mutually physically separate reception elements (E1, E2). The reception elements (E1, E2) are not formed by the emission elements (S1, S2), but are physically separate from all emission elements (S1, S2). The two emission elements (S1, S2) are operated alternately with pauses in such a manner that in each instance firstly only one of the emission elements (e.g. S1) emits an ultrasonic pulse, which is thereafter received by the reception element (E1) associated with this emission element (S1), and only after such reception does the other emission element (S2) emit ultrasound, which is thereafter received by the reception element (E2) associated with this emission element (S2). The main lobes of the directional characteristics of the emission elements (S1, S2) and reception elements (E1, E2) are oriented so that each reception element (E1, E2) receives particularly clearly those emission signals of the emission element (S1, S2) associated with it (E1, E2) which propagate by repeated reflections in each instance via a plurality of panes (VS1/VS2, HS1/HS2) in the V interior of the motor vehicle.

23 Claims, 1 Drawing Sheet

ULTRASONIC MONITORING SYSTEM FOR THE INTERIOR OF A MOTOR VEHICLE

BACKGROUND OF THE INVENTION

The invention represents a development of an ultrasonic monitoring system for the interior of a motor vehicle and which, per se, is previously known, for example, from German reference DE-A1-2,817,492. This known system already permits the monitoring of the interior of a motor vehicle with relatively little effort.

In addition, U.S. Pat. No. 3,805,223 discloses an ultrasonic monitoring system having a single ultrasonic emission element and a single ultrasonic reception element—both elements having a more or less marked directional characteristic—which system is employed for the observation of fish or aquatic animals in a region filled with water—for example in an aquarium or in a pool. The main lobes of the directional characteristics of these elements are set to be oriented so that repeated reflections via a plurality of boundaries of the region filled with water—that is to say, for example, via the panes of the aquarium—are also clearly utilized, so that the movements of the fish through the monitoring system can be automatically registered not only on a rectilinear path in the water, but in a larger space in the water.

Figure 1:
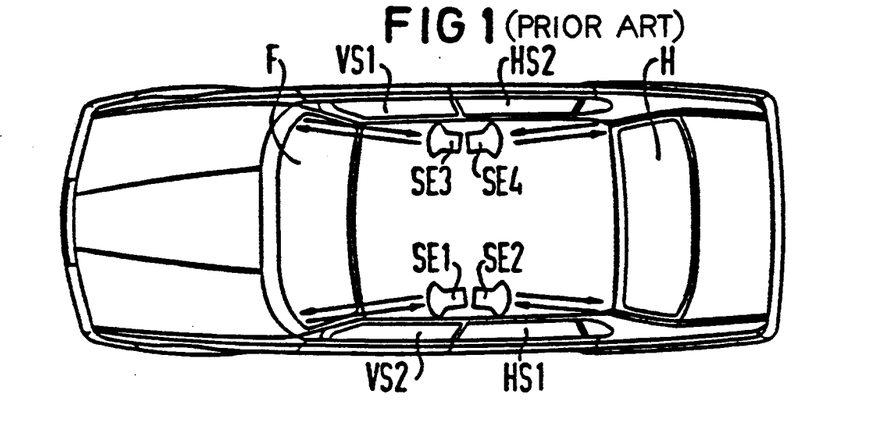
FIG. 1 is a plan view of a motor vehicle having a prior art monitoring system.

The invention presupposes that the ultrasonic monitoring system which is described below and which is shown in FIG. 1 also forms part of the prior art:

The motor vehicle shown in FIG. 1 exhibits, inter alia, six panes, namely four side panes VS1, VS2, HS1 and HS2, as well as lateral panes F and H at front and rear, namely a front pane F and a rear pane H.

Fitted on the internal surface of the roof of the motor vehicle, in the vicinity of the so-called B spars, i.e. between the front and rear side panes VS1/HS2, VS2/HS1, there are four radar elements SE1 to SE4 for ultrasonic radar, which radar elements, as is very frequently the case with radar systems, are employed in each instance both as emission elements with a marked directional characteristic and also as reception elements with a marked directional characteristic.

The main lobes of the emission directional characteristics and of the reception directional characteristics of all four radar elements SE1 to SE4 are, at least to a large extent, oriented in each instance in the same direction. In this case, the interior of the motor vehicle is thus, so to speak, monitored by a total of four emission elements and four reception elements, of which, however, each emission element forms a physical unit with a reception element. In this case, the four radar elements SE1 to SE4 monitor in each instance, more or less, only approximately one quarter of the motor vehicle interior surface represented in the plan view.

To this end, in operation, the four radar elements SE1 to SE4 emit ultrasonic pulses at a specified frequency or in a specified frequency pattern, in each instance towards a specified region on a lateral pane F, H, in each instance to the left or to the right of the center of the lateral pane, or into adjacent regions close to the pane; in this case, these four radar elements, after their switch-over, receive in each instance as reception elements especially that ultrasound which was reflected by the regions which were ensonified by these radar elements themselves in the emission phase. The received signals are converted into electrical signals in the reception elements, and, thereafter, are passed to one or more control circuits which, for their part, evaluate these signals.

In this case, these four radar elements SE1 to SE4 also monitor to a greater or lesser extent the side panes which are adjacent to the principal axis of the main lobe of the ultrasonic beam and which belong to the quarter of the interior surface. Within this ensonified region, including the pertinent side panes, certain reflections also occur, so that, via the main lobe of the reception directional characteristic of these four radar elements SE1 to SE4, certain components of ultrasonic waves which are also repeatedly reflected within the ensonified region are also received and jointly evaluated. These received, repeatedly reflected ultrasonic waves are then, however, in each instance emitted entirely, or at least preferably, by the same radar element (i.e. less from the other three radar elements) into this region.

Specifically, in the case of the example shown in FIG. 1, it is typical that the principal axes or main lobes of the emission directional characteristics and of the reception directional characteristics of all radar elements SE1 to SE4 coincide to a large extent in each instance. In any case, the principal axes of the emission directional characteristic and of the reception directional characteristic, considering each individual path of the radar elements SE1 to SE4, are not intentionally oriented in entirely different directions, in order in a controlled manner to receive as far as possible only such an ultrasonic flow as was originally emitted by another emission element in entirely different directions and thus into entirely different regions of the interior of the motor vehicle and which is intentionally received and evaluated only after repeated reflections, which are distributed over large regions of the interior of the motor vehicle.

In addition, German reference DE-C2 2,938,969—which is equivalent to European reference EP-B1-26,385 discloses an ultrasonic monitoring system in which, by means of the storage of echo profiles and by means of adaptive progressive adaptations of the system to such movements, automatic elimination takes place of those disturbances which are generated by movements which are intrinsically harmless, e.g. of air striations and fans and the like.

SUMMARY OF THE INVENTION

The object of the invention,
- to be able to reduce the cost of emission elements and reception elements for monitoring of an interior, and nevertheless as far as possible to be able to monitor all important pane regions and/or other regions alongside the panes (e.g. stowage surfaces for bags) with particular care,
- to be able to avoid the cost of centralized or decentralized control circuits and their wiring to one another for disturbance-free synchronised reciprocating switching of each respective individual radar element for alternate operation as an emission element and as a reception element, and
- to require particularly little ultrasonic emission power, as the one ultrasonic beam, which is not influenced by any disturbance, no longer disturbs the other ultrasonic beam, which detects a disturbance, on account of superpositions, and thus a particularly high sensitivity of the arrangement can be achieved, is attainable by the subject matter defined as follows.

An ultrasonic monitoring system for the interior of a motor vehicle has side panes and, at the front and at the rear, has lateral panes, thus having a front pane and a rear pane. Two emission elements, e.g. piezoelectric crystals which, in operation, emit at least times ultrasound with a more or less marked directional characteristic, are secured in the motor vehicle interior and/or in the boundary thereof.

The main lobes of the directional characteristics of the emission elements in the motor vehicle are oriented in different directions, wherein only two emission elements are used. At least one reception element, e.g. piezoelectric crystals, but as a rule at least two mutually physically separate reception elements are used in the motor vehicle interior and/or at the boundary thereof, which reception elements, in operation, receive at least at times components of the emitted ultrasound. The reception elements are not formed by the emission elements, but are physically separate from all emission elements.

After their activation, the two emission elements are operated alternately with pauses, in such a manner that in each instance only one of the emission elements emits an ultrasonic pulse, which is thereafter received by the reception element associated with this emission element, and that only after this reception does the other emission element emit an ultrasound, which is thereafter received by the reception element associated with this emission element, before the one of the emission elements again emits an ultrasonic pulse.

The main lobes of the directional characteristics of the emission elements and the main lobes of the space pattern/patterns of the reception element/elements are oriented in such a manner that the reception element associated with the first emission element clearly receives those emission signals of the first emission element which propagate by repeated reflections in each instance via a plurality of panes in the interior of the motor vehicle, and that the reception element associated with the second emission element receives particularly clearly those emission signals of the second emission element which propagate by repeated reflections in each instance via a plurality of panes in the interior of the motor vehicle.

Thus, the invention is based inter alia, in particular, on the use of in each instance (only!) two mutually separate emission elements and reception elements, the two emission elements being operative alternately. It is further based on the utilization, in a controlled manner, of repeated reflections of each one of the two emitted ultrasonic currents on a plurality of spatially widely distributed reflecting surfaces in series, approximately in, in each instance, one half of the interior of the motor vehicle or in even larger portions of the interior of the motor vehicle. In this case, accordingly, such oblique angles of incidence and reflection, especially also oblique angles of incidence and reflection on the panes and pane surroundings to be monitored, are utilized for the ultrasonic flow for the generation of the repeated reflections that, also on account of this, just one emission element and one reception element are adequately sufficient for comprehensive monitoring extending into important edge regions of the pertinent half of the interior of the motor vehicle.

The additional measures defined as follow permit the attainment of additional advantages. In the monitoring system the first emission element substantially monitors, in conjunction with the first reception element associated with it, at least one half of the interior of the motor vehicle, and the second emission element substantially monitors, in conjunction with the second reception element associated with it, at least the other half of the interior of the motor vehicle. This permits monitoring of all the important portions of the interior with little cost relating to structural measures and power, namely in each instance the ability to monitor, using a single emission element and a single reception element with particularly high reliability, at least approximately one half of the interior of the motor vehicle, and in this case especially also edge regions of this respective half.

In the monitoring system the emission elements and the reception elements are provided as mutually spatially separate elements in each instance at or near the internal surface of the roof of the motor vehicle, and more specifically, substantially, in the region of the spars situated between the front side panes and the rear side panes. This permits easy adjustment, on their own account, of the principal axes of the main lobes of the directional characteristics of the individual elements, and the attainment of the reliability of the functions of these elements, these elements then being fitted at positions of the interior at which positions these elements trouble the occupants of the motor vehicle, e.g. even when entering or alighting from said vehicle, to a particularly slight extent.

In the monitoring system the first emission element monitors, in conjunction with the first reception element, preferentially the alarm-relevant regions of the front half of the interior of the motor vehicle, e.g. the front motor vehicle regions close to the panes, and the second emission element monitors, in conjunction with the second reception element, preferentially the alarm-relevant regions of the rear half of the interior of the motor vehicle, e.g. the rear motor vehicle regions close to the panes.

To this end, the directional characteristic of the first emission element is oriented substantially towards the one front side pane, e.g. towards the one adjacent to this first emission element, and the directional characteristic of the first reception element is oriented substantially towards the other front side pane situated on the other side of the motor vehicle, in these circumstances, the one adjacent to this first reception element, so that the ultrasound emitted by the first emission element, generated by repeated reflections, propagates at least to a considerable extent on the following path:

first to the front side pane towards which the directional characteristic of the first emission element is oriented;

thereafter, at least in part to regions at and/or below the front pane;

thereafter, at least in part to the opposite other front side pane; and thereafter, at least in part towards the first reception element, after which this first reception element evaluates the reception signal received by it.

The directional characteristic of the second emission element is oriented substantially towards the one rear side pane, e.g. towards the one adjacent to this second emission element, and the directional characteristic of the second reception element is oriented substantially towards the other rear side pane situated on the other side of the motor vehicle in these circumstances, towards the one adjacent to this second reception element, so that the ultrasound emitted by the second emission element, generated by repeated reflections, propagates at least to a considerable extent on the following path:

first to that rear side pane towards which the directional characteristic of the second emission element is oriented, thereafter, at least in part to regions at and/or below the rear pane;

thereafter, at least in part to the opposite other rear side pane; and thereafter, at least in part towards the second reception element, after which this second reception element evaluates the reception signal received by it. This permits the monitoring with little cost, separately in each case, of the front and the rear half of the interior, including the panes thereof. In the monitoring system the first emission element monitors, in conjunction with the first reception element, preferentially the alarm-relevant regions of the left-hand lateral half of the interior of the motor vehicle, e.g. preferentially its motor vehicle regions close to the pane, and the second emission element monitors, in conjunction with the second reception element, preferentially the alarm-relevant regions of the right-hand lateral half of the interior of the motor vehicle, e.g. its rear motor vehicle regions close to the panes.

To this end, the directional characteristic of the first emission element is oriented substantially towards the left-hand of one of the lateral panes, e.g. of the front pane, and/or somewhat therebelow and/or somewhat thereabove, and the directional characteristic of the first reception element is oriented substantially towards the left-hand half of the other lateral pane, in these circumstances, the rear pane, so that the ultrasound emitted by the first emission element, generated by repeated reflections, propagates at least to a considerable extent on the following path:

first to that lateral pane towards which the directional characteristic of the first emission element is oriented;

thereafter, at least in part to and/or along at least one of the left-hand side panes;

thereafter, at least in part to the other lateral pane; and thereafter, at least in part towards the first reception element, after which this first reception element evaluates the reception signal received by it.

The directional characteristic of the second emission element is oriented substantially towards the right-hand half of one of the lateral panes, e.g. the front pane, and/or somewhat therebelow and/or somewhat thereabove, and the directional characteristic of the second reception element is oriented more or less towards the right-hand half of the other lateral pane, in these circumstances, the rear pane, so that the ultrasound emitted by the second emission element, generated by repeated reflections, propagates at least to a considerable extent on the following path:

first to that lateral pane towards which the directional characteristic of the second emission element is oriented;

thereafter, at least in part to and/or along at least one of the right-hand side panes;

thereafter, at least in part to the other lateral pane; and thereafter, at least in part towards the second reception element, after which this second reception element evaluates the reception signal received by it. This permits the monitoring with little cost, separately in each case, of the left-hand and thee right-hand half of the interior, including the panes (pane regions) thereof. In the monitoring system the emission and the reception elements are fitted in the region of the spars so that their directional characteristics intersect in each instance the center line between the (left-hand and right-hand, or front and rear) motor vehicle lateral halves which are monitored to a large extent separately in each case, before they impinge upon those panes onto which they are directly oriented. This permits additionally, the monitoring of internal portions of the interior, including, with expedient guidance of the ultrasonic beam, a roof opening (especially where the pertinent ultrasonic beam is also reflected at this roof opening), and, if required, the attainment with particularly little cost of, in addition, a strong reflection of the ultrasonic beam in the desired direction at a reflecting surface which is then ensonified at a particular angle of incidence. In the monitoring system the emission elements and the reception elements are fitted in the region of the spars so that their directional characteristics impinge, in each instance, without intersecting the center line between the (left-hand and right-hand, or front and rear) motor vehicle lateral halves which are monitored to a large extent separately in each case, upon those panes onto which they are directly oriented. This permits the monitoring of in particular edge regions of the interior of the motor vehicle using a particularly low ultrasonic powers. In the monitoring system to increase that power of the reception signals which can be received by repeated reflection, in addition to the pertinent regions of panes there are fitted, in the interior of the motor vehicle, reflecting surfaces which act as acoustic mirrors, e.g. formed by metal surfaces, and which further reflect the ultrasonic current in the desired direction. This permits the capability to reduce the emission power of the pertinent emission element, since the pertinent ultrasonic beam, which is transferred by repeated reflection by means of acoustic mirrors, can be more intensively concentrated and the ultrasonic beam follows the desired path particularly closely.

In operation, the two emission elements emit ultrasonic pulses with a specified frequency or with a frequency pattern. This permits the capability to achieve even more reliable monitoring of an interior than with an ultrasound emitted continuously over relatively long periods of time. In the monitoring system in the motor vehicle there are provided one or more control circuits, of which at least some control in each instance the operation of the emission elements and, of which at least some evaluate in each instance the reception signals received by the reception element. The control circuit/circuits evaluating the reception signals have a memory for the storage of characteristic TARGET values concerning the pertinent reception signals, e.g. concerning their profile, as well as a comparator circuit to test whether the respective reception signals, measured with reference to the stored TARGET value/values, exhibit a deviation exceeding a threshold. This permits the capability to test the received signals for alarm-relevant disturbances, in a simple manner, and the capability to eliminate disturbances due to movements which are harmless per se.

After each renewed activation of the monitoring system, by means of the control circuit/circuits, in each instance one or more of the TARGET values are derived from the then initially received reception signals and are stored in the memory. This permits the capability to tolerate longer-duration changes to the interior of the motor vehicle, e.g. a coat and a shopping bag left in the interior of the motor vehicle on leaving the motor vehicle, without such interior changes, which are per se of great magnitude but which then do not move any longer, immediately triggering an alarm. The control circuit/circuits adaptively forms/form at least one of the stored TARGET values and, to this end, at least from time to time, derives/derive one or more new TARGET values from the then received reception signals and stores/store said new TARGET values in the memory. This permits the capability to tolerate slow changes in the propagation conditions within the interior of the motor vehicle, which changes thus do not trigger any major changes to the received signals to be evaluated in each instance, i.e. for example slow changes brought about by temperature changes or air striations, without such slow changes immediately triggering an alarm. The comparator circuit can establish, by means of one or more TARGET values, whether one or more of the amplitudes of the reception signal have meanwhile changed in a manner which is typical of alarm situations. The comparator circuit can also establish, by means of one or more TARGET values, whether one or more of the frequencies of the reception signal have meanwhile changed in a manner which is typical of alarm situations. Furthermore, the comparator circuit can establish, by means of one or more TARGET values, whether the transit time of the reception signal between the pertinent emission element and the pertinent reception element has meanwhile changed in a manner which is typical of alarm situations. This permits the utilization of various criteria for the recognition of alarm-relevant disturbances, it being possible for these criteria to be applied also in any desired combination with one another to achieve a further increase in the reliability with which an alarm-relevant situation can be recognized. In operation, the system utilizes, at least at times, the Doppler effect. This permits the utilization, in an elegant manner known per se, of a criterion for the recognition of alarm-relevant disturbances. In operation, after recognition of a deviation exceeding the threshold value, the control circuit/circuits of the system additionally tests/test whether a deviation based on the Doppler effect is also present. This permits the capability to recognize as such, and thus the capability to eliminate, disturbances which are generated by air striations and which may be generated for example thermally, with a high degree of dependability. Emission element, reception elements and/or control circuit/circuits, intended for a monitoring system as described above the offering of component parts of the invention which are important on their own account.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

Figure 2:
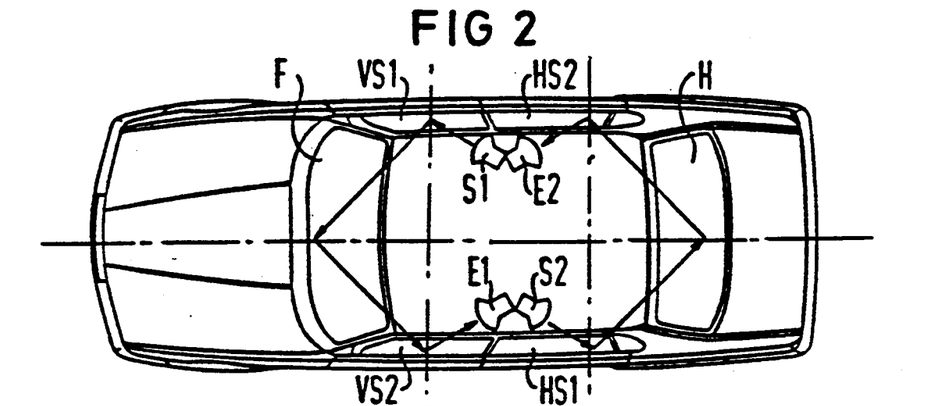
FIG. 2 is a plan view of a motor vehicle having a monitoring system according to the present invention.
Figure 3:
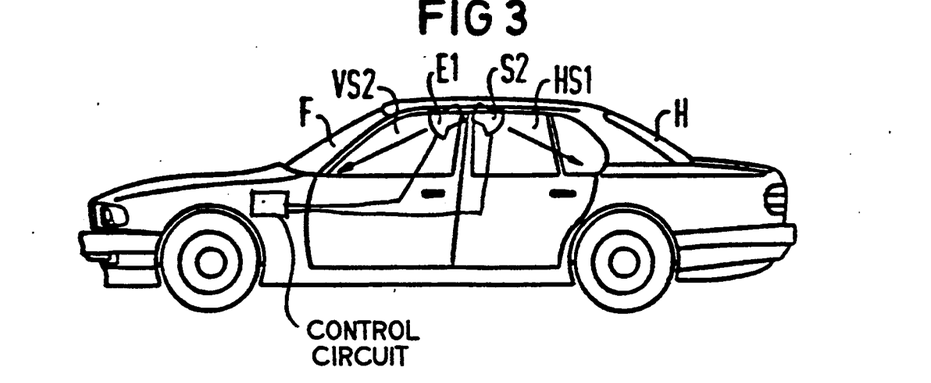
FIG. 3 is a side elevation of a motor vehicle having a monitoring system according to the present invention.

Thus, these figures relate to a motor vehicle interior with, at the sides, side panes VS1, VS2, HS1 and HS2 and with, at the front and rear, lateral panes F and H, i.e. with a front pane F and a rear pane H.

Two emission elements S1, S2, both of which exhibit, to a more or less marked extent, a directional characteristic and which operate, for example, on a piezoelectric basis, are mounted separated from one another in the motor vehicle interior, namely on the internal surface of the roof. In operation, these emission elements S1, S2 emit, at least at times, ultrasound at a specified frequency or with a frequency pattern.

Another two reception elements E1, E2 both of which likewise exhibit, to a more or less marked extent, their own directional characteristic and likewise operate, for example, on a piezoelectric basis, are mounted separated from one another and also separately from the emission elements S1, S2 on the same internal surface of the roof, albeit with a different orientation of their directional characteristics. In operation, these reception elements E1, E2 receive at least at times certain, and indeed as far as possible large, components of the ultrasound emitted by the emission elements S1, S2. Thus, in operation, each one of the two reception elements E1, E2 receives the ultrasound which is emitted essentially by only one of the emission elements. Thus, each one of the two reception elements is associated with a respective one of the two emission elements.

However, the principal axis of the main lobe of the directional characteristic of each one of the emission elements S1, S2 and the principal axis of the main lobe of the directional characteristic of the reception element associated with the pertinent emission element point in different directions. Thus, in the example shown in FIG. 2, the pertinent principal axis of the first emission element S1 points towards the right-hand front side pane VS1 and the principal axis of the associated first reception element E1 towards the left-hand front side pane VS2. Moreover, in this example, the principal axis of the second emission element S2 points towards the left-hand rear side pane HS1 and the principal axis of the second reception element E2 associated with this second emission element S2 points towards the right-hand rear side pane HS2.

In this manner, as a result of this particular orientation of the main lobes of the directional characteristics, each reception element E1 or E2 receives particularly clearly those emission signals of the emission elements S1 and S2 respectively which are specifically associated with them in each instance, which propagate by repeated reflections in each instance via a plurality of the panes in the motor vehicle interior, and specifically in the example shown in FIG. 2 by reflections along, more or less, the periphery of the motor vehicle interior: specifically, in the example shown in FIG. 2, the ultrasound propagates from the first emission element S1 via the path VS1 - F - VS2 to the first reception element E1, as well as from the second emission element S2 on the path HS1 - H - HS2 to the second reception element E2.

As a result of this particular, non-coincident orientation of the directional characteristics of the emission elements S1, S2 and of the reception elements E1, E2, the first pair of elements S1/E1, i.e. the first emission element S1 in conjunction with the first reception element E1, can thus preferably monitor approximately one of the halves of the interior of the motor vehicle—in the example shown in FIG. 2, this is the front half of the interior. The second pair of elements S2/E2, i.e. the second emission element S2 in conjunction with the second reception element E2, on the other hand preferably monitors approximately the other, in this case rear, half of the interior of the motor vehicle.

After being started up, the two emission elements S1, S2 are operated alternately with pauses so that in each instance firstly only one of the emission elements, e.g. S1, emits an ultrasonic pulse, which is thereafter received by the reception element E1 associated with this emission element S1, and that only after this reception does the other emission element S2 emit ultrasound, which is thereafter received by the reception element E2 associated with this emission element S2. This then requires particularly little ultrasonic emission power, as the one ultrasonic beam, which is not influenced by any disturbance, no longer disturbs the other ultrasonic beam by superpositions, whereby a particularly high sensitivity of the arrangement can be achieved.

The cost of emission elements and reception elements for the monitoring of an interior is thus particularly small in the case of the invention, even though in the case of the invention in each instance approximately one half of the interior of the motor vehicle is monitored with a particularly high reliability using a single emission element and a single reception element, and specifically in particular also the important edge regions of this respective half are so monitored. Thus, to monitor the entire interior, it is sufficient to provide two emission elements and, physically separated therefrom, two reception elements; in this case, all their directional characteristics, or all principal axes of their main lobes, are differently oriented, so that preferably just the repeated reflections which take place via the most widely varying reflecting surfaces are utilized. Just as a result of the non-coincidence, according to the invention, of the main lobes of the directional characteristics, especially of their principal axes, within each associated pair of elements S1/E1, S2/E2, it can be achieved that important pane regions and/or other regions alongside the panes—e.g. also stowage surfaces for bags and town plans—are monitored with special care, in spite of a particularly low level of cost.

However, in comparison with the prior art shown in FIG. 1, even more cost is avoided by the invention. To be precise, that prior art requires complicated centralized or decentralized control circuits and their wiring for the disturbance-free reciprocating switching of each individual one of the four radar elements SE1 to SE4. This type of control circuit for the alternate operation of the radar elements SE1 to SE4 as emission elements and as reception elements is unnecessary in the case of the invention, since separate emission elements S1, S2 and reception elements E1, E2 are fitted, which are less complicated to operate and also require less complex wiring between these elements and the control circuit.

In the example shown in FIGS. 2 and 3, the emission elements S1, S2 and the reception elements E1, E2 are fitted in each instance on or near the internal surface of the roof of the motor vehicle, and specifically in each instance more or less in the region of the so-called B spars, i.e. in the region of the spars which are situated between the front large side panes VS1, VS2 and the rear large side panes HS1, HS2. In these circumstances, it is possible easily to adjust the principal axes of the main lobes of the directional characteristics of the individual elements S1, S2, E1, E2 on their own account so that the intended repeated reflections take place reliably. Moreover, these elements S1, S2, E1, E2 scarcely then disturb the later motor vehicle users or motor vehicle occupants, for example not even when entering and alighting from the motor vehicle.

As may in particular be inferred from FIG. 2, it is possible with little cost to monitor, separately in each case, the alarm-relevant regions of the front and of the rear halves of the interior, including their panes, in the manner according to the invention. To this end, the four elements S1, S2, E1, E2, and especially the principal axes of their main lobes, are appropriately arranged within the interior of the motor vehicle:

The first emission element S1 monitors, in conjunction with the first reception element E1, preferably the alarm-relevant regions of the front half of the interior of the motor vehicle, e.g. the front motor vehicle regions VS1, F, VS2, close to the panes, cf. FIG. 2. The second emission element S2 monitors, in conjunction with the second reception element E2, preferably the alarm-relevant regions of the rear half of the interior of the motor vehicle, e.g. the rear motor vehicle regions VS1, F, VS2 close to the panes. The directional characteristic of the first emission element S1 is oriented more or less towards the one front side pane VS1—e.g. towards the one adjacent to this first emission element S1. On the other hand, the directional characteristic of the first reception element A1 is oriented more or less towards the other front side pane VS2 situated on the other side of the motor vehicle—in these circumstances, the one adjacent to this first reception element E1. In this case, the two orientations take place so that the ultrasound emitted by the first emission element S1, generated by repeated reflections, propagates at least to a considerable extent via the alarm-relevant regions on the following path to the first reception element E1:

Firstly, the ultrasound emitted by the first emission element S1 flows to that front side pane VS1 towards which the directional characteristic of the first emission element S1 is oriented. The ultrasound is reflected on this side pane VS1 and thereafter flows at least in part further on to regions approximately at the center at and/or below the front pane F, where it is again reflected—specifically so that thereafter it flows at least in part to the opposite other front side pane VS2. There, the ultrasound is once again reflected and thereafter flows at least in part towards the first reception element E1, after which this first reception element E1 evaluates the reception signal received by it.

In a similar manner, the second elements S2, E2 are employed to monitor the rear half of the interior of the motor vehicle:

The directional characteristic of the second emission element S2 is oriented more or less towards the one rear side pane HS1 e.g. towards the one adjacent to this second emission element S2. On the other hand, the directional characteristic of the second reception element E2 is oriented more or less towards the other rear side pane HS2 situated on the other side of the motor vehicle—in these circumstances, towards the one adjacent to this second reception element E2. These two orientations take place so that the ultrasound emitted by the second emission element S2, generated by repeated reflections, propagates at least to a considerable extent via the alarm-relevant regions on the following path to the second reception element E2:

Firstly, the ultrasound emitted by the second emission element S2 flows to that rear side pane HS1 towards which the directional characteristic of the second emission element S2 is oriented. After reflection on this pane, the ultrasound thereafter flows at least in part further on to regions approximately at the center on and/or below the rear pane H. After the reflection taking place there, the ultrasound flows at least in part further on to the opposite other rear side pane VS2, where the ultrasound is once again reflected, so that thereafter it flows at least in part further on towards the second reception element E2. Finally, the reception signal received by this second reception element E2 is evaluated.

However, it is possible to set the boundaries of the interior halves to be monitored in a different way. For example—likewise with particularly little effort—it is possible to monitor separately in each case the left-hand and the right-hand halves of the interior, including their panes (pane regions), in the following manner:

The first emission element S1 monitors, in conjunction with the first reception element E1, preferentially the alarm-relevant regions of the left-hand lateral half of the interior of the motor vehicle, e.g. preferentially its motor vehicle regions F (left-hand region), VS2, HS1, H (left-hand region) close to the panes. On the other hand, the second emission element S2 monitors, in conjunction with the second reception element E2, preferentially the alarm-relevant regions of the right-hand lateral half of the interior of the motor vehicle, e.g. its rear motor vehicle regions F (right-hand region), VS1, HS2, H (right-hand region) close to the panes. To this end, the directional characteristic of the first emission element S1 is oriented more or less towards the left-hand half of one of the lateral panes, e.g. of the front pane F (left-hand region), and/or somewhat therebelow and/or somewhat thereabove, and the directional characteristic of the first reception element E1 is oriented more or less towards the left-hand half of the other lateral pane, i.e. in these circumstances the rear pane H (left-hand region). In this case, these two orientations take place in such a manner that the ultrasound emitted by the first emission element S1, generated by repeated reflections, propagates at least to a considerable extent via alarm-relevant regions on the following path to the first reception element E1:

Firstly, the ultrasound emitted by the first emission element S1 flows to that lateral pane F (left-hand region) towards which the directional characteristic of the first emission element S1 is oriented. After the reflection thereon of the ultrasound, the latter flows at least in part to and/or along at least one of the left-hand side panes VS2, HS1 and thereafter at least in part to the other lateral pane H (left-hand region), where the ultrasound is again reflected. Thereafter the ultrasound flows at least in part towards the first reception element E1, after which this first reception element E1 evaluates the reception signal received by it.

On the other hand, the directional characteristic of the second emission element S2 is oriented more or less towards the right-hand half of one of the lateral panes, e.g. the front pane F (right-hand region), and/or somewhat therebelow and/or somewhat thereabove. Moreover, the directional characteristic of the second reception element E2 is oriented more or less towards the right-hand half of the other lateral pane, in these circumstances the rear pane H (right-hand region). These two orientations also take place in such a manner that the ultrasound emitted by the second emission element S2, generated by repeated reflections, propagates at least to a considerable extent via alarm-relevant regions on the following path to the second reception element E2:

Firstly, the ultrasound emitted by the first emission element S1 flows to that lateral pane, cf. F/right, towards which the directional characteristic of the second emission element S2 is oriented. There the ultrasound is reflected, after which the latter flows at least in part to and/or along at least one of the right-hand side panes VS2, HS1. After this, the ultrasound flows at least in part to the other lateral pane, cf. H (right-hand region), where it is again reflected. After this, the ultrasound flows at least in part towards the second reception element E2, after which this second reception element E2 evaluates the reception signal received by it.

Using the invention—irrespective of whether monitoring takes place, separately in each case, of the right-hand and left-hand, or the front and rear halves of the interior—it is possible additionally to monitor internal portions of the interior, and indeed, with expedient guidance of the ultrasonic beam, even a possibly present roof opening—in which case, in addition, it is even possible also to arrange for the reflection, directly on the surface (pane) of the roof opening, of ultrasound which has been conducted past this roof opening. To this end, it is possible to fit the emission elements S1, S2 and the reception elements E1, E2 in the region of the spars VS2/HS1, VS1/HS2, so that their directional characteristics in each instance cross the boundary or center line between the left-hand and the right-hand (or front and rear) motor vehicle lateral halves, before they impinge on those panes onto which they are directly oriented. If necessary, it is then even possible in addition, with particularly little cost, also to achieve a particularly strong reflection of the ultrasonic beam in a desired direction on that reflecting surface—which is then ensonified at a particular angle of incidence —towards which the directional characteristic of the respective emission element is oriented.

Frequently, it is possible—in any event in a number of types of motor vehicle—to monitor particularly easily edge regions of the interior of the motor vehicle as well, using particularly little ultrasonic power, if the emission elements S1, S2 and the reception elements E1, E2 are fitted in the region of the B spars between the panes VS1/HS1, VS1/HS2 so that their directional characteristics impinge, in each instance, without crossing the boundary or center line between the left-hand and the right-hand (or front and rear) motor vehicle lateral halves, on those panes onto which they are directly oriented. This saving of power is particularly significant in the case of those types of motor vehicle whose battery is relatively small, e.g. especially where the entire motor vehicle is to be built, for reasons of cost, with only very little outlay.

It is also possible to reduce the emission power of the pertinent emission elements, i.e. of S1 and/or S2, by fitting, specifically to increase that power of the reception signals which can be received by repeated reflection, in addition to the pertinent reflecting regions of panes, cf. F, SS1, VS2, HS1, HS2 and H, reflecting surfaces acting in each instance as acoustic mirrors—formed for example by appropriately shaped plastic surfaces in the interior covering/interior upholstery and/or by appropriately shaped particular metal surfaces—which reflecting surfaces there further reflect the ultrasonic beam in a desired direction with high efficiency. In these circumstances, specifically the pertinent ultrasonic beam reflected thereat by means of the acoustic mirror is, if required, additionally more highly concentrated, in addition to the fact that in these circumstances the ultrasonic beam follows the desired path or the desired direction particularly well, as a result of the acoustic mirror.

Even more reliable monitoring of an interior than with an ultrasound ensonified quasi-continuously during very long periods of time can be achieved in that, in operation, the two emission elements S1, S2 emit such short ultrasonic pulses at a specified frequency or with a frequency pattern, that not only is the entire interior of the motor vehicle monitored quasi-continuously by the rapid change in the activation of the emission elements S1, S2, but that the system can also register echo profiles. For this purpose, there are a whole series of favorable developments:

It is possible in a simple manner to test the reception signals for alarm-relevant disturbances, in that one or more control circuits are fitted in the motor vehicle, at least some of which control in each instance the operation of the emission elements S1, S2, and at least some of which evaluate in each instance the reception signals received by the reception element E1, E2. The control circuit/circuits evaluating the reception signals can additionally be equipped with a memory, in order to store characteristic TARGET values concerning the pertinent reception signals—e.g. concerning their profile. A comparator circuit additionally fitted in the control circuit can then test, with reference to the content of the memory, whether the respective reception signals exhibit a deviation exceeding a threshold, i.e. a an alarm-relevant deviation.

It is then also possible to make the monitoring system particularly resistant to disturbances. To this end, it may for example be desired to tolerate longer-duration changes to the interior of the motor vehicle, for example a coat and a shopping bag being left in the interior of the motor vehicle on leaving the motor vehicle, without such interior changes, which are per se of great magnitude, but which then no longer exhibit any movement, immediately triggering an alarm. To this end, after each renewed activation of the monitoring system, it is possible by means of the control circuit/circuits, in the first instance to derive one or more new TARGET values from the then initially received reception signals and to store said TARGET values as new TARGET values in the memory. All later signals received by the reception elements E1, E2 are then compared with these new values corresponding to the current condition of the interior on leaving the motor vehicle, instead of with a standard condition, which is unable to take into consideration such arbitrary features as deposited coats and shopping bags.

Disturbances due to movements which are per se harmless, e.g. due to air currents and rotating fans, can then also automatically be eliminated by an appropriate adaptive progressive correction of the stored TARGET values. Accordingly, such movements do not trigger any alarm if the control circuit/circuits at least from time to time —at least as long as the reception signals differ only slightly from the stored TARGET values—derives/derive one or more new TARGET values from the most recent reception signals and stores said new TARGET values in the memory for the ensuing, later comparisons. In this connection, cf. also the aforementioned German reference dE-C2 2,938,969—and corresponding European reference EP-B1-26,385. Furthermore, slow changes to the propagation conditions in the interior of the motor vehicle, which changes thus do not trigger any substantial changes in the reception signals to be evaluated in each instance, i.e. for example slow temperature changes or weak air striations in the interior of the motor vehicle, can be rendered innocuous by such an adaptive correction of the stored TARGET values, in order to reduce the risk of false alarm triggerings. Thus, such slow changes are also innocuous where the control circuit/circuits, at least from time to time, as long as the reception signals differ only slightly from the stored TARGET values, derives/derive one or more new TARGET values from the most recent reception signals and stores/store said new TARGET values in the memory for the ensuing, later comparisons.

It is possible to utilize various criteria—only individual ones thereof or a plurality thereof in any arbitrary combination—for the recognition of alarm-relevant disturbances. Thus, for example, the comparator circuit can establish, by means of one or more TARGET values, whether in each instance one or more of the amplitudes of the reception signal have changed in a manner which is typical of alarm situations. The comparator circuit can also establish, by means of one or more TARGET values, whether one or more of the frequencies of the reception signal have meanwhile changed in a manner which is typical of alarm situations. The comparator circuit can also establish, by means of one or more TARGET values, whether the transit time of the reception signal between the pertinent emission element and the pertinent reception element has meanwhile changed in a manner which is typical of alarm situations.

It is, however, also possible to utilize the Doppler effect —on its own account, but also in addition to other criteria—as the criterion for recognition of alarm-relevant disturbances, by utilizing or jointly utilizing the Doppler effect at least at times during operation. Such a utilization of the Doppler effect is then possible in a particularly elegant manner if in addition, as described, the ultrasound is in each instance emitted in pulses—instead of continuously—where at least some of the aforementioned criteria for such pulsed operation are utilized for the recognition of alarm-relevant disturbances, and where, in addition, its aforementioned control circuit/circuits tests/test in operation, after recognition of a deviation exceeding the threshold, whether a deviation based on the Doppler effect is also present. As a result of this, it is for example possible with a high degree of reliability to recognize as such, and thus to eliminate, disturbances which are generated by air striations and which may for example be thermally generated.

The invention comprises not only the monitoring arrangement installed in the motor vehicle, but also its important component parts on their own account, namely the emission elements S1, S2, reception elements E1, E2 and/or control circuit/circuits, where they are intended for a monitoring system according to the invention, described above.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

| List of reference symbols | |
|---|---|
| E1 | Reception element |
| E2 | Reception element |
| F | Front pane |
| H | Rear pane |
| HS1 | Rear side pane |
| HS2 | Rear side pane |
| S1 | Emission element |
| S2 | Emission element |
| SE1 | Emission/reception element |
| SE2 | Emission/reception element |
| SE3 | Emission/reception element |
| SE4 | Emission/reception element |
| VS1 | Front side pane |
| VS2 | Front side pane |

What is claimed is:

1. An ultrasonic monitoring system for an interior of a motor vehicle having side panes and, at a front and at a rear of the motor vehicle, having lateral panes, comprising:
   two emission elements which, in operation, emit ultrasound with a substantially marked directional characteristic, located in the motor vehicle interior and/or in the boundary thereof, and
   main lobes of the directional characteristics of the emission elements in the motor vehicle oriented in different directions,
   at least one reception element located in the motor vehicle interior and/or at the boundary thereof, the at least one reception element, in operation, receiving components of the emitted ultrasound,
   the at least one reception element being physically separate from all emission elements, the two emission elements being operated alternately with pauses, in such a manner
   that in each instance only a first one of the emission elements emits an ultrasonic pulse, which is thereafter received by the reception element associated with this emission element, and
   that only after this reception does the other emission element emit an ultrasonic pulse, which is thereafter received by the reception element associated with the other emission element, before the first one of the emission elements again emits an ultrasonic pulse,
   the main lobes of the directional characteristics of the emission elements and main lobes of space pattern/patterns of the reception element/elements oriented in such a manner
   that the reception element associated with the first emission element clearly receives emission signals of the first emission element which propagate by repeated reflections in each instance via a plurality of panes in the interior of the motor vehicle, and
   that the reception element associated with the second emission element clearly receives emission signals of the second emission element which propagate by repeated reflections in each instance via a plurality of panes in the interior of the motor vehicle.

2. The monitoring system as claimed in patent claim 1, wherein the system has first and second reception elements and wherein
   the first emission element monitors, in conjunction with the first reception element associated with the first emission element, substantially at least one half of the interior of the motor vehicle, and wherein
   the second emission element monitors, in conjunction with the second reception element associated with the second emission element, substantially at least the other half of the interior of the motor vehicle.

3. The monitoring system as claimed in patent claim 1, wherein the system has first and second reception elements and wherein the side panes are composed of front side panes and rear side panes and wherein
   the emission elements and the reception elements are mutually spatially separate elements at or near an internal surface of a roof of the motor vehicle, and substantially in the region of spars that are situated between the front side panes and the rear side panes.

4. The monitoring system as claimed in patent claim 1, wherein the system has first and second reception elements and wherein the side panes are composed of front side panes and rear side panes and the lateral panes are composed of a front lateral pane and a rear lateral pane and wherein
   the first emission element monitors, in conjunction with the first reception element, alarm-relevant regions of a front half of the interior of the motor vehicle,
   the second emission element monitors, in conjunction with the second reception element, alarm-relevant regions of the rear half of the interior of the motor vehicle,
   the directional characteristic of the first emission element oriented substantially towards one front side pane adjacent to this first emission element, and the directional characteristic of the first reception element oriented substantially towards the other front side pane situated on the other side of the motor vehicle that is adjacent to this first reception element, so that ultrasound emitted by the first emission element, generated by repeated reflections, propagates at least to a considerable extent on the following path:
   firstly to that front side pane towards which the directional characteristic of the first emission element is oriented,
   thereafter, at least in part to regions at and/or below the front lateral pane,
   thereafter, at least in part to the opposite other front side pane, and
   thereafter, at least in part towards the first reception element,
   after which this first reception element evaluates the reception signal received by the first reception element, and
   the directional characteristic of the second emission element oriented substantially towards one rear side pane adjacent to this second emission element, and the directional characteristic of the second reception element oriented substantially towards the other rear side pane situated on the other side of the motor vehicle adjacent to this second reception element, so that ultrasound emitted by the second emission element, generated by repeated reflections, propagates at least to a considerable extent on the following path:
   firstly to that rear side pane towards which the directional characteristic of the second emission element is oriented, thereafter, at least in part to regions at and/or below the rear lateral pane, thereafter, at least in part to the opposite other rear side pane, and thereafter, at least in part towards the second reception element, after which this second reception element evaluates the reception signal received by the second reception element.

5. The monitoring system as claimed in patent claim 1, wherein the system has first and second reception elements and wherein the side panes are composed of front side panes and rear side panes and the lateral panes are composed of a front lateral pane and a rear lateral pane and wherein the first emission element monitors, in conjunction with the first reception element, alarm-relevant regions of a left-hand lateral half of the interior of the motor vehicle, the second emission element monitors, in conjunction with the second reception element, alarm-relevant regions of a right-hand lateral half of the interior of the motor vehicle, the directional characteristic of the first emission element oriented substantially towards a left-hand half of one of the lateral panes, and/or somewhat therebelow and/or somewhat thereabove, and the directional characteristic of the first reception element oriented substantially towards a left-hand half of the other lateral pane so that ultrasound emitted by the first emission element, generated by repeated reflections, propagates at least to a considerable extent on the following path:

firstly to that lateral pane towards which the directional characteristic of the first emission element is oriented, thereafter, at least in part to and/or along at least one of the left-hand side panes, thereafter, at least in part to the other lateral pane, and thereafter, at least in part towards the first reception element, after which this first reception element evaluates the reception signal received by the first reception element, and the directional characteristic of the second emission element oriented substantially towards right-hand half of one of the lateral panes, and/or somewhat therebelow and/or somewhat thereabove, and the directional characteristic of the second reception element oriented substantially towards a right-hand half of the other lateral pane so that ultrasound emitted by the second emission element, generated by repeated reflections, propagates at least to a considerable extent on the following path:

firstly to that lateral pane towards which the directional characteristic of the second emission element is oriented, thereafter, at least in part to and/or along at least one of the right-hand side panes, thereafter, at least in part to the other lateral pane, and thereafter, at least in part towards the second reception element, after which this second reception element evaluates the reception signal received by the second reception element.

6. The monitoring system as claimed in patent claim 4, wherein the emission elements and the reception elements are located in a region of spars so that respective directional characteristics of the respective emission elements and the respective reception elements intersect at a center line between the lateral halves of the motor vehicle which are monitored substantially separately, before they impinge upon those panes onto which they are directly oriented.

7. The monitoring system as claimed in patent claim 4, wherein the emission elements and the reception elements are located in a region of spars so that respective directional characteristics of the emission elements and the respective reception elements impinge without intersecting at a center line between the lateral halves of the motor vehicle which are monitored substantially separately, upon those panes onto which they are directly oriented.

8. The monitoring system as claimed in patent claim 1, wherein to increase the power of the reception signals which is received by repeated reflection, in addition to pertinent regions of the side and lateral panes reflecting surfaces are located in the interior of the motor vehicle, which act as acoustic mirrors and which further reflect the ultrasonic emissions in a desired direction.

9. The monitoring system as claimed in patent claim 1, wherein the two emission elements emit ultrasonic pulses with a specified frequency of with a frequency pattern.

10. The monitoring system as claimed in patent claim 9, wherein the monitoring system further comprises at least one control circuit in the motor vehicle control circuit/circuits, control the operation of each of the emission elements and, evaluate reception signals received by the reception element, and the control circuit/circuits evaluating the reception signals having a memory for the storage of characteristic TARGET values concerning the pertinent reception signals as well as a comparator circuit to test whether the respective reception signals, measured with reference to the stored TARGET value/values, exhibit a deviation exceeding a threshold value.

11. The monitoring system as claimed in patent claim 10, wherein after each renewed activation of the monitoring system, by means of the control circuit/circuits, for each reception signal at least one of the TARGET values are derived from initially received reception signals and are stored in the memory.

12. The monitoring system as claimed in patent claim 11, wherein the control circuit/circuits adaptively forms/form at least one of the stored TARGET values and, at least from time to time, derives/derive one or more new TARGET values from the then received reception signals and stores/store said new TARGET values in the memory.

13. The monitoring system as claimed in patent claim 10, wherein the comparator circuit establishes, by means of at least One TARGET value, whether at least one of the amplitudes of the reception signal have changed in a manner which is indicative of alarm situations.

14. The monitoring system as claimed in patent claim 10, wherein the comparator circuit establishes, by means of at least one TARGET value, whether at least one of the frequencies of the reception signal have changed in a manner which is indicative of alarm situations.

15. The monitoring system as claimed in patent claim 10, wherein the comparator circuit establishes, by means of at least one TARGET value, whether the transit time of the reception signal between a respective emission element and a respective reception element has changed in a manner which is indicative of alarm situations.

16. The monitoring system as claimed in patent claim 1, wherein said system utilizes, at least at times, the Doppler effect.

17. The monitoring system as claimed in patent claim 10, wherein after recognition of a deviation exceeding the threshold value, the control circuit/circuits of the system additionally tests/test whether a deviation based on the Doppler effect is also present.

18. The monitoring system as claimed in patent claim 5, wherein the emission elements and the reception elements are located in a region of spars that are situated between the front side panels and the rear side panels so that respective directional characteristics of the emission elements and the reception elements intersect at a center line between the lateral halves of the motor vehicle which are monitored substantially separately, before they impinge upon those panes onto which they are directly oriented.

19. The monitoring system as claimed in patent claim 5, wherein the emission elements and the reception elements are located in a region of spars that are situated between the front side panels and the rear side panels so that respective directional characteristics of the emission elements and the respective elements impinge without intersecting at a center line between the lateral halves of the motor vehicle which are monitored substantially separately, upon those panes onto which they are directly oriented.

20. The monitoring system as claimed in patent claim 4, wherein the alarm-relevant regions of the front half of the interior of the motor vehicle are regions close to the front side panes and the front lateral pane, and wherein the alarm-relevant regions of the rear half of the interior of the motor vehicle are regions close to the rear side panes and the rear lateral pane.

21. The monitoring system as claimed in patent claim 5, wherein the alarm-relevant regions of the left-hand lateral half of the interior of the motor vehicle are regions close to the front and rear side panels on the left side of the motor vehicle and portions of the front and rear lateral panes on the left side of the motor vehicle, and wherein the alarm-relevant region on the right-hand lateral half of the interior of the motor vehicle are regions close to the front and rear side panes on the right side of the motor vehicle and portions of the front and rear lateral panes on the right side of the motor vehicle.

22. The monitoring system as claimed in patent claim 8, wherein the acoustic mirrors are metal surfaces.

23. The monitoring system as claimed in patent claim 10, wherein the characteristic TARGET values are representative of profiles of the reception signals.

* * * * *